United States Patent
Marson

(10) Patent No.: US 8,328,390 B2
(45) Date of Patent: Dec. 11, 2012

(54) HIGH IRRADIANCE THROUGH OFF-CENTER OPTICS

(75) Inventor: Jonathan L. Marson, Hillsboro, OR (US)

(73) Assignee: Phoseon Technology, Inc., Hillsboro, OR (US)

(*) Notice: Subject to any disclaimer, the term of this patent is extended or adjusted under 35 U.S.C. 154(b) by 475 days.

(21) Appl. No.: 12/248,739

(22) Filed: Oct. 9, 2008

(65) Prior Publication Data

US 2010/0091493 A1    Apr. 15, 2010

(51) Int. Cl.
    *F21V 5/00* (2006.01)
(52) U.S. Cl. ............ 362/244; 362/311.02; 362/326
(58) Field of Classification Search ........ 362/244–246,
        362/249.02, 326–332, 311.02, 311.12, 339,
        362/612–613, 617–620
    See application file for complete search history.

(56) References Cited

U.S. PATENT DOCUMENTS

| | | | | |
|---|---|---|---|---|
| 4,935,665 A | * | 6/1990 | Murata | 313/500 |
| 5,174,649 A | * | 12/1992 | Alston | 362/244 |
| 5,515,253 A | * | 5/1996 | Sjobom | 362/244 |
| 5,896,093 A | * | 4/1999 | Sjobom | 340/815.75 |
| 6,244,727 B1 | * | 6/2001 | Ryan et al. | 362/244 |
| 6,682,331 B1 | | 1/2004 | Peh et al. | |
| 7,300,177 B2 | * | 11/2007 | Conner | 362/244 |
| 7,352,011 B2 | | 4/2008 | Smits et al. | |
| 7,736,019 B2 | * | 6/2010 | Shimada et al. | 362/244 |
| 2002/0006040 A1 | * | 1/2002 | Kamada et al. | 362/237 |
| 2005/0179041 A1 | * | 8/2005 | Harbers et al. | 257/80 |
| 2007/0030676 A1 | * | 2/2007 | Ichihara | 362/244 |
| 2007/0109790 A1 | * | 5/2007 | Anderson et al. | 362/326 |
| 2008/0048200 A1 | | 2/2008 | Mueller et al. | |
| 2008/0203415 A1 | | 8/2008 | Thompson et al. | |

\* cited by examiner

*Primary Examiner* — Alan Cariaso
(74) *Attorney, Agent, or Firm* — Alleman Hall McCoy Russell & Tuttle LLP

(57) ABSTRACT

A light fixture has an array of light emitting diodes arranged on a substrate, an array of lenses arranged adjacent the diodes, each lens corresponding to a diode, and having a center, the array of lenses arranged such that the each lens center is offset from a location of the diode. A light fixture has an array of light emitting diodes arranged in a x-y grid on a substrate, and an array of lenses arranged adjacent the array of light emitting diodes, each lens corresponding to a diode and having a center, the array of lenses arranged such that each lens center is offset a distance along a location axis of the diode.

15 Claims, 3 Drawing Sheets

HIGH IRRADIANCE THROUGH OFF-CENTER OPTICS

BACKGROUND

Ultraviolet (UV) curing has many applications in printing, coating and sterilization. UV-sensitive materials generally rely upon a particular amount of energy in the form of UV light to initiate and sustain the curing process (polymerization) within the materials. UV light fixtures provide the UV light to the materials for curing.

Using arrays of light emitting diodes (LEDs) in UV curing has several advantages over using arc lamps, including lower power consumption, lower cost, cooler operating temperatures, etc. Generally, the arrays consist of individual LED elements arranged in an X-Y grid on a substrate. Lenses may be molded over the arrays, such that a lens corresponds to each LED element and is centered over the element. The lenses may be raised or lowered on the Z-axis for focus. This type of fixture produces a reliable source of UV light having a highly-efficient, steady, uniform irradiance output.

However, UV curing processes generally have a non-linear polymerization rate that relates directly to the amount of energy supplied to initiate and sustain the reaction. These processes would benefit greatly from a higher peak irradiance.

DETAILED DESCRIPTION OF THE EMBODIMENTS

Figure 1:
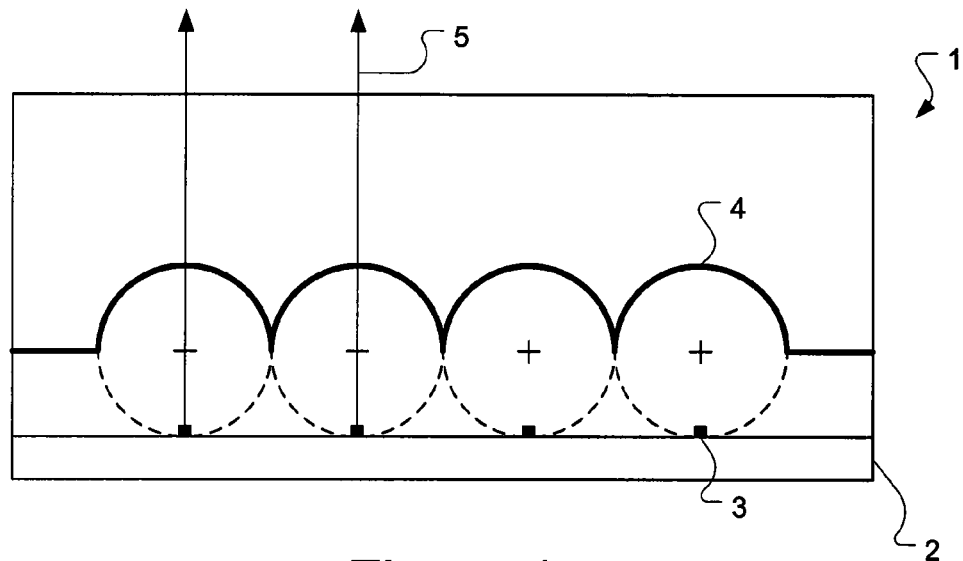
FIG. 1 shows an example of an LED lighting fixture with corresponding lenses.

FIG. 1 shows a side view of an example of an LED fixture 1 having corresponding individual lenses. The fixture 1 may consist of many different components, but will generally include a substrate 2, upon which is formed an array of light emitting elements such as 3, typically light emitting diodes (LEDs).

Each LED 3 has a corresponding lens 4. Generally, these lenses align with the LEDs so that the center of the lens, if it were considered circular, would align with its corresponding LED. This results in light traveling out of the fixture primarily in the direction shown by arrow 5. The fixture produces a steady, efficient light output. For purposes of this discussion, efficiency correlates to optical power versus electrical power consumed by the fixture. In UV applications, the optical power would be optical power emitted in the UV contributing to a material transformation process, such as polymerization.

As discussed above, some light applications benefit greatly from light fixtures with high peak irradiance. For purposes of this discussion, 'high' peak irradiance means a peak irradiance higher than the irradiance achieved under the same electrical and mechanical operating conditions as in FIG. 1. The overall efficiency of this fixture 10 may actually be lower than the previous example 1, due to increased loss to total internal reflection and a greater percentage of the emitted light being reflected back towards the substrate where it may be absorbed, but there is a region 30 that has a higher irradiance than that achievable in the previous example 1.

Figure 2:
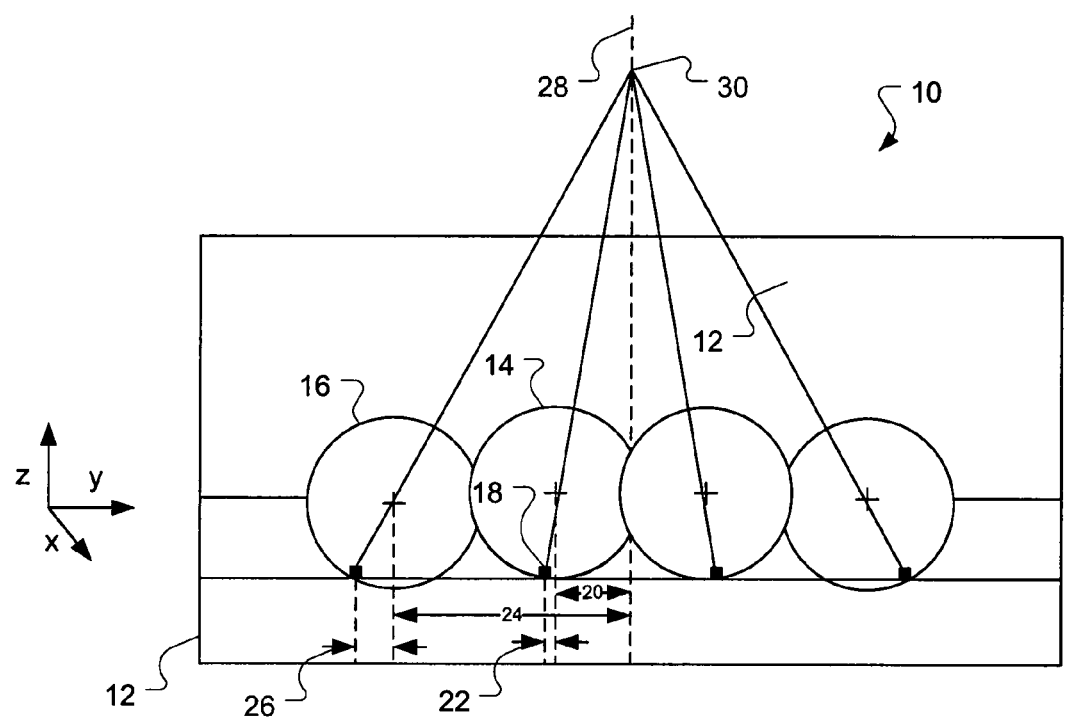
FIG. 2 shows a side view of an embodiment of an LED lighting fixture with offset lenses.

FIG. 2 shows a side view of an embodiment of a light fixture having high peak irradiance. The fixture 10 has an array of LEDs such as 18 formed on a substrate 12. Each LED has corresponding lenses, but the lenses differ from those used in previous implementations. The centers of the lenses do not align with the centers of the LEDs.

For example, the lens 14, if considered to be circular, would have its center displaced a distance 22 from the center, or location, of the LED 18. Further, the center of lens 14 resides at a distance 20 from a center line 28 of the fixture 10. For purposes of orientation of the drawing in FIG. 2, the y-axis traverses the drawing from left to right, the x-axis is coming out of the page, and the z-axis is oriented from bottom to top. Light travels in the z-axis direction. The center line 28 may coincide with a line that, if extended, would include a focal point 30. If the lenses seen in side view were repeated in the x-axis direction coming out of the page, the resulting light output would have a focal line along the x-axis at a given height in the z-axis where the irradiance is significantly greater than that achievable using a fixture such as that in FIG. 1.

The lenses 14 and 16 may have different offset distances, where the offset distance is the distance in at least one axis that the center of the lens differs from the location of the LED. In terms of FIG. 2, the distances 22 and 26 may be different. In addition, the distance 24 may not be a multiple of the distance 20. For example, if the lens 14 were to be at a distance X from the center line 28, the lens 16 would not necessarily be at a distance 2X. Similarly, the center of lens 14 may lie in a different location along the x-axis than the center of lens 16, making the lenses offset from each other relative to a common axis of the LED array. In the example shown, this axis would be the y-axis. For purposes of this discussion, the x, y and z axes will be referred to as the location axes and may have either a particular LED or the center line of the fixture at its origin. In addition to the lenses having different offset distances, the lenses may all have the same diameter or different diameters.

As mentioned previously, the peak irradiance at the focal point 30 for a particular set of lenses may be higher than that of the fixture with a symmetrical array of lenses with the same electrical and mechanical configuration, as that shown in FIG. 1. In experiments, a fixture similar to the one shown in FIG. 2 achieved an irradiance reading at the focal point 30 that was 150% of that achieved with a fixture similar to FIG. 1. For fixtures that repeat the lenses shown in FIG. 2 along the x-axis, this focal point becomes a line of high irradiance illumination, making it suitable for curing applications, especially for fixtures that have surfaces to be cured that move past them.

Figure 3:
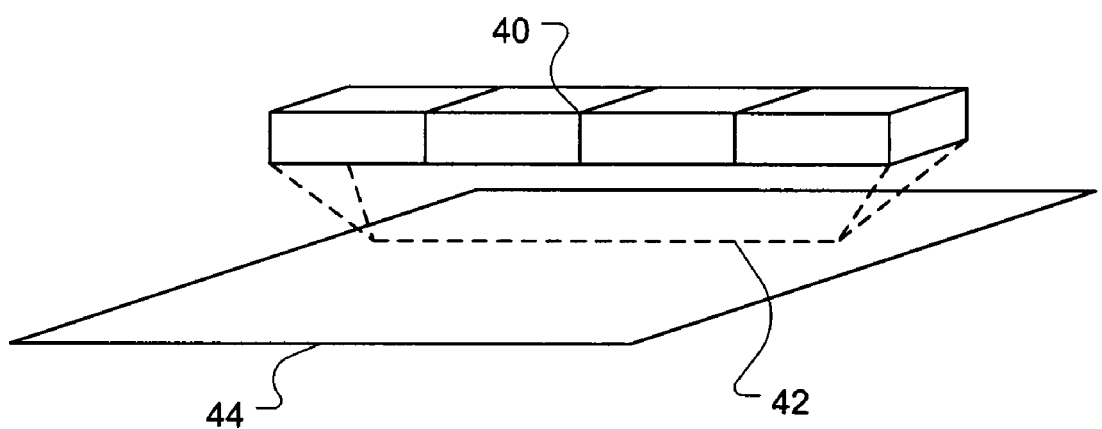
FIG. 3 shows a UV curing system using at least one LED light fixture having offset lenses.

FIG. 3 shows an example of a system that includes multiple light fixtures 40, each in turn comprising multiple 'sets' of lenses such as those shown in FIG. 2. This type of configuration results in light being output in a 'bar' or 'line' 42. Using a system that can move the light fixture relative to a curing surface 44 can then apply this light bar to cure such things as ink, paint, coatings, light sensitive materials such as resist, etc. The system may have the light fixture moving over the surface, or the surface may move past a fixed light fixture. One example would include producing ultraviolet light to cure UV-sensitive polymers in such things as semiconductor processing. However, any type of light wavelength and any kind of material that is light curable may be used. Indeed, the embodiments discussed here could be used in visible light applications, such as lighting fixtures for public places and homes.

Figure 4:
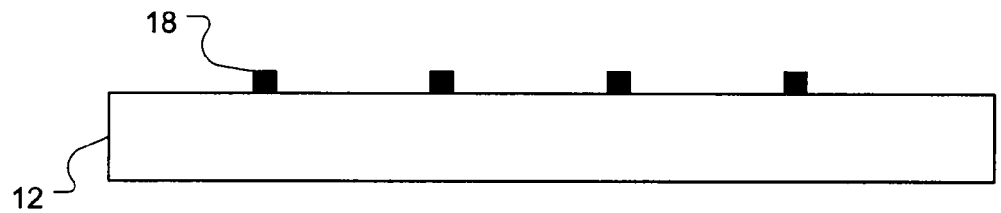
FIGS. 4-6 show a process for manufacturing an LED lighting fixture having offset lenses.
Figure 5:
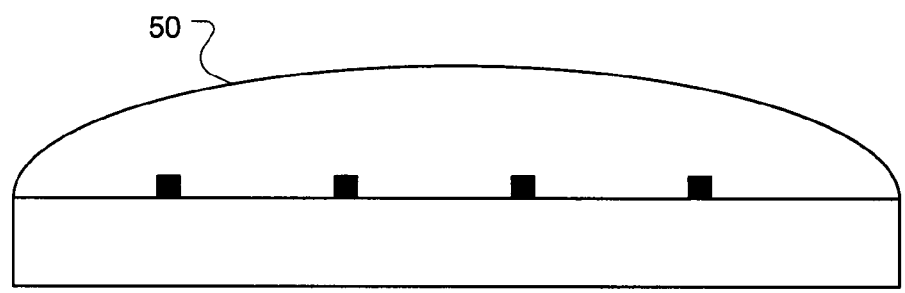
Figure 6:
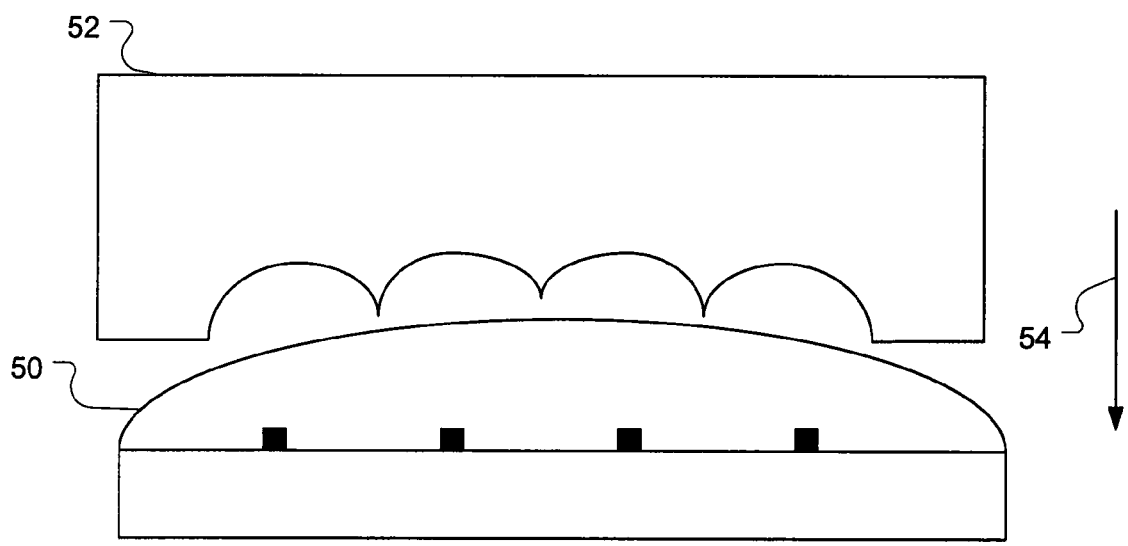

FIGS. 4-6 show a process flow that may result in a light fixture such as those discussed here. In FIG. 4, a substrate is provided. Typically the substrate consists of a semiconductor substrate 12. An array of light emitting elements such as 18, typically light emitting diodes, is then arranged on the substrate. The array may be manufactured onto the substrate, or may be provided as pre-manufactured arrays that are mounted onto the substrate.

An array of lenses is then arranged adjacent the array of light emitting elements. The lenses are arranged such that the center of each lens is offset from a location, such as a center, of the light emitting element. The location of the light emitting element may be viewed as the origin of an x, y, and z axis. Being 'offset' from the location means that the center of the lens is offset along at least one of these axes.

In some circumstances the lens may be offset along two of these axes. For example, in FIG. 1, the lens center of lens 4 would be offset along the z-axis, but aligned along the other axes. This is the 'starting' position of the lens 14 in FIG. 2. However, in FIG. 2, the lens is also offset a distance along the y-axis from the location of the light emitting element. In addition, the lenses may have different offsets in the x-axis. For example, lenses may reside at different distances from the corresponding LEDs, with a first lens being at a distance m from its LED, and a second lens being at a distance n from its LED.

In the particular embodiment shown in FIG. 5, the lens array is arranged by first depositing a clear polymer or other substance 50 that will generally exist in a gel form. The substance should not harm the light emitting elements, the substrate, or any circuit traces on the substrate. The substance should have the properties of optical transparency and be formable and solidifiable into a desired shape.

As shown in FIG. 6, the desired shape may result from a mold 52, the underside of which has formed into it the desired lens configuration. The formation of the desired lens configuration may be effected by machining or injection molding the configuration into a block of material.

The mold 52 is pressed down, as shown by arrow 54, onto the gel 50. The gel would then be solidified by curing, such as by heating, exposure to light or exposure to a hardening substance. The mold is then removed and the fixture as shown in FIG. 2 would result.

In this manner, a light fixture having high peak irradiance at a specified location is provided. The light fixture may be chained together with other similarly configured light fixtures to create a curing or other system needing illumination.

Thus, although there has been described to this point a particular embodiment for a method and apparatus for optics used with LEDs, it is not intended that such specific references be considered as limitations upon the scope of this invention except in-so-far as set forth in the following claims.

What is claimed is:

1. A light fixture, comprising:
    an array of light emitting diodes arranged on a substrate;
    an array of lenses arranged on the diodes and the substrate to receive light directly from the diodes, each lens corresponding to a diode and having a center, the array of lenses arranged such that the each lens center is offset from a center of the diode and lenses positioned at different positions relative to a center line of the fixture have different lengths of offset from the center of the diode such that light from each line of diodes in the array is directed to a focal point.

2. The light fixture of claim 1, wherein the lens center is offset along at least one of the x, y and z axes of the center of the diode.

3. The light fixture of claim 1, wherein the lens center of each lens is offset such that the light from each diode combines to form a point of light.

4. The light fixture of claim 1, where the light emitting diodes are repeated along the x-axis.

5. The light fixture of claim 4, wherein the offset distance for each lens is in an x-direction.

6. The light fixture of claim 1, wherein the lens center of a first lens has a different distance from the corresponding diode for the first lens than a distance a second lens has from the corresponding diode for the second lens.

7. The light fixture of claim 1, wherein the lenses have one of either the same diameter or different diameters.

8. The light fixture of claim 1, wherein the light emitting diodes emit ultraviolet light.

9. A light fixture, comprising:
    an array of light emitting diodes arranged in a x-y grid on a substrate; and
    an array of lenses arranged on the array of light emitting diodes and the substrate to receive light directly from the diodes, each lens corresponding to a diode and having a center, the array of lenses arranged such that each lens center is offset a distance along a location axis of the diode and lenses positioned at different positions relative to a center line of the fixture have different lengths of offset from the center of the diode such that light from a line of diodes is directed to a focal point.

10. The light fixture of claim 9, wherein the array of lenses is arranged such that each lens center is offset from the center of at least one adjacent lens.

11. The light fixture of claim 9, wherein the center line is a central focal line.

12. The light fixture of claim 9, wherein the light emitting diodes emit ultraviolet light.

13. A method, comprising:
    providing a substrate;
    forming an array of light emitting diodes on the substrate; and
    arranging an array of lenses on the diodes and the substrate, such that each lens corresponds to one diode and the lenses receive light directly from the diodes, the lenses arranged such that a center of each lens is offset from a center of each diode and lenses positioned at different positions relative to a center line of the fixture have different lengths of offset from the center of the diode, wherein arranging the array of lenses comprises:
    depositing a layer of gel on the array of light emitting diodes and the substrate;
    molding forming the layer of gel into the array of lenses; and
    solidifying the array of lenses.

14. The method of claim 13, wherein pressing a mold onto the layer of gel comprises forming the mold by machining a desired shape for the array of lenses into the mold.

15. The method of claim 13, wherein solidifying the array of lenses comprises heating the layer of gel while in the mold.

* * * * *